United States Patent
Vervoort et al.

(10) Patent No.: US 10,822,178 B2
(45) Date of Patent: Nov. 3, 2020

(54) APPARATUS, SYSTEM AND METHOD FOR SORTING PRODUCTS

(71) Applicant: Vanderlande Industries B.V., Veghel (NL)

(72) Inventors: Petrus Theodorus Cornelis Vervoort, Veghel (NL); Fred Van Toor, Veghel (NL)

(73) Assignee: Vanderlande Industries B.V., Veghel (NL)

(*) Notice: Subject to any disclaimer, the term of this patent is extended or adjusted under 35 U.S.C. 154(b) by 0 days.

(21) Appl. No.: 16/493,806

(22) PCT Filed: Mar. 13, 2018

(86) PCT No.: PCT/NL2018/050155
§ 371 (c)(1),
(2) Date: Sep. 13, 2019

(87) PCT Pub. No.: WO2018/169392
PCT Pub. Date: Sep. 20, 2018

(65) Prior Publication Data
US 2020/0130953 A1    Apr. 30, 2020

(30) Foreign Application Priority Data

Mar. 17, 2017 (NL) .................................... 2018542

(51) Int. Cl.
*B65G 47/46* (2006.01)
*B65G 47/84* (2006.01)

(52) U.S. Cl.
CPC .......... *B65G 47/46* (2013.01); *B65G 47/844* (2013.01); *B65G 2207/36* (2013.01)

(58) Field of Classification Search
CPC .................. B65G 47/844; B65G 47/845; B65G 2207/36; B65G 47/46
(Continued)

(56) References Cited

U.S. PATENT DOCUMENTS 3,731,782 A    5/1973  Del Rosso
5,038,912 A *  8/1991  Cotter .................. B65G 47/844
                                          198/370.02
(Continued)

FOREIGN PATENT DOCUMENTS

EP    1134172 A1    9/2001
EP    1783071 A1    5/2007

OTHER PUBLICATIONS

International Search Report and Written Opinion of the International Searching Authority dated Sep. 20, 2018 issued in corresponding PCT Appln. No. PCT/NL2018/050155.

*Primary Examiner* — James R Bidwell
(74) *Attorney, Agent, or Firm* — Carter, DeLuca & Farrell LLP

(57) ABSTRACT

The system and method for sorting products include a device comprising a frame, carriers for products, pusher members which are displaceable along a carrier, guide means with a guiding member for guiding the pusher member in a conveying direction during transportation of the carriers in order to move it in a length direction of the carrier, for the purpose of laterally moving a product off the supporting surface at a discharge location, a presorting switch device with a presorting switch member in order, in an active presorting position, to move or keep the pusher member to or in a second transverse position, a switchable switch device with a switch member in order, in an active position, to move the pusher member in such a way that the guide member is subsequently guided by the guiding member.

21 Claims, 4 Drawing Sheets

(58) Field of Classification Search
USPC .......................... 198/370.02, 370.07, 370.08
See application file for complete search history.

(56) References Cited

U.S. PATENT DOCUMENTS

| | | | | |
|---|---|---|---|---|
| 5,131,522 | A * | 7/1992 | Fujio | B65G 47/844 |
| | | | | 198/370.02 |
| 5,135,100 | A * | 8/1992 | Cotter | B65G 47/844 |
| | | | | 198/370.02 |
| 5,427,223 | A * | 6/1995 | van Den Goor | B65G 47/844 |
| | | | | 198/370.01 |
| 6,478,144 | B1 | 11/2002 | Sweazy | |
| 8,727,096 | B2 * | 5/2014 | Schroader | B65G 47/844 |
| | | | | 198/370.01 |
| 2005/0000779 | A1 * | 1/2005 | Neiser | B65G 47/844 |
| | | | | 198/370.08 |
| 2005/0029077 | A1 | 2/2005 | Enomoto | |
| 2007/0289839 | A1 * | 12/2007 | Zimmer | B65G 47/844 |
| | | | | 198/370.02 |
| 2014/0360838 | A1 * | 12/2014 | Wilkins | B65G 47/46 |
| | | | | 198/370.02 |
| 2016/0325315 | A1 | 11/2016 | Zimmer et al. | |

\* cited by examiner

APPARATUS, SYSTEM AND METHOD FOR SORTING PRODUCTS

CROSS-REFERENCE TO RELATED APPLICATION

This application is a National Stage Application under 35 U.S.C. § 371(a) of PCT/NL2018/050155, filed Mar. 13, 2018, which claims the benefit of and priority to Netherlands Patent Application No. 2018542 filed Mar. 17, 2017. The entire contents of all of the foregoing applications are incorporated by reference herein.

SUMMARY

The present invention relates to a device, system and a method for sorting products.

U.S. Pat. No. 7,516,835 B2 and U.S. Pat. No. 5,217,105 A each disclose a conveying device for objects, comprising a frame with a number of carriers which cooperate with pusher shoes which can be moved laterally.

It is an object of the present invention to provide a sorting device which makes it possible to sort products at high speed.

Said object is achieved by the device according to the invention, such as defined in claim 1, for sorting products, comprising a frame, successive elongate carriers which form a supporting surface for products, a drive device for conveying the carriers in a conveying direction and along an endless conveying path, in which the length direction of the carriers extends at right angles to the conveying direction, in a transverse direction. The device furthermore comprises pusher members, each of which is displaceable along a carrier. In order words, each carrier has an associated pusher member. Each of the pusher members comprises a pusher shoe on a first side of the carrier situated on the supporting surface, and, on an opposite second side of the carrier, a guide member which is connected to the pusher shoe. The device furthermore comprises guide means which are provided on the frame, comprising a stationary guiding member which is connected to the frame and runs substantially at an angle with respect to the conveying direction for, in use, during transportation of the carriers in the conveying direction, guiding the guide member of a pusher member in order thus to displace the pusher member in the length direction of the associated carrier for the purpose of laterally moving a product situated on the supporting surface at a discharge location off the supporting surface. The device also comprises a presorting switch device which is provided on the frame and comprising a presorting switch member which can be switched between a passive and an active presorting position and is configured such that, in the passive presorting position, it causes a pusher member to remain in a first transverse position or to move towards the latter in the length direction of the associated carrier, and, in the active presorting position, it causes a pusher member to remain in a second, other, transverse position or to move towards the latter in the length direction of the associated carrier. The device also comprises a switchable switch device, which switch device is provided downstream of the presorting switch device and is provided on the frame, at the location of an upstream end of the guiding member, and comprising a switch member which is switchable between a passive and an active position thereof and is configured to allow, in the passive position, a pusher member which is in the second transverse position to pass along the upstream end of the guiding member, and, in the active position, to move a pusher member which is in the second transverse position in the length direction of the associated carrier on account of contact between a contact surface of the switch member and the guide member of the pusher member, in such a way that the guide member is subsequently guided by the guiding member, in which guide members of pusher members which are in the first transverse position are outside the reach of the switch device and, in use, pass along the latter irrespective of the position of the switch member.

In a preferred embodiment, the device is provided with more than one of said guide means, each with one said guiding member, and more than one of said switchable switch devices, provided downstream of the presorting switch device, in which each switch device is provided at the location of an upstream end of the guiding member of guide means associated with that switch device and each switch device comprising one said switch member. The device may thus comprise more combinations of a switch device with associated guide means, such as for the purpose of being able to laterally move a product off the supporting surface at the location of several discharge locations, and/or for the purpose of being able to parallel sort a product, which will be explained below in more detail.

An effect of the device according to the invention is that the presence of the presorting switch device in addition to the switch device makes it possible only to move or keep those pusher members to or in the second transverse position which will actually be used for sorting a product, that is to say laterally move it off the supporting surface. As a result thereof, more space can be created between successive pusher members, in particular if, for example each time after a pusher member has been moved to the second transverse position or kept there, the next pusher member is moved to the first position or kept there. This selective presorting of pusher members makes it possible to increase the conveying speed of the carriers with pusher members in the conveying direction, and thus the sorting, without the time available for a switch member of the switch device to switch from or to the active position becoming too short. As a result thereof, the power of displacement means, such as solenoids or servomotors, of the switch member does not have to be increased (and/or the switching time does not have to be reduced), such as would be the case with prior-art devices and which would significantly increase the costs of the device, which is undesirable.

With the device according to the invention, the guide means are situated on a side of the second transverse position which faces away from the first transverse position. That is to say, viewed in top view, the first transverse position is situated on a side of the second transverse position and the guide means are situated on the other, opposite side of the second transverse position.

In a preferred embodiment, the device is configured to allow the pusher members to be in the first transverse position upstream of, that is to say at least directly upstream of, the presorting switch device. In this case, the presorting switch member is thus configured such that, in the passive presorting position, it causes a pusher member to remain in a first transverse position, and, in the active presorting position, it causes a pusher member to move towards the second transverse position, preferably on account of contact between a contact surface of the presorting switch member and the guide member of the pusher member.

For the purpose of allowing the pusher members to be in the first transverse position upstream of the presorting switch device, the device may comprise an elongate, stationary resetting guiding member which is provided on the frame in such a way that pusher members which are situated outside the first transverse position, such as for example in the second transverse position or yet another transverse position, such as the end position described below, move to the first position on account of contact between the resetting guiding member and the guide member of the pusher members. Such a resetting guiding member may, for example, be provided on a bottom side of the device, where the carriers with associated pusher members move back along the endless conveying path, which in that case follows a path which, viewed in the vertical plane, is endless, in order to again be transported in the conveying direction towards the presorting switch device at an upstream end of the device.

In a preferred embodiment, the device comprises a determining device configured to determine the carrier(s) which form the part of the supporting surface on which a product rests. As a result thereof, the determining device is thus also configured to determine those pusher members by means of which a product is to be laterally moved off the supporting surface at the location of a discharge location, and thus also to determine a position of a product on the supporting surface, viewed in the conveying direction.

In this case, it is favourable if the presorting switch device is configured to be in the active presorting position for the benefit of at least one pusher member of the pusher members, preferably for the benefit of at least two pusher members of the pusher members, associated with the determined carriers, and to be in the passive presorting position for the benefit of the pusher member which is situated directly upstream of the most upstream pusher member of the at least one pusher member. This creates more space between pusher members present at the second transverse position associated with different products in case of parallel sorting, but also in the case of non-parallel sorting, the effects of which have already been discussed above. In this case, it is possible for a length of the contact surface of the switch member to be larger in the conveying direction.

Parallel sorting is understood to mean that, using two or more switch devices which are positioned in succession in the conveying direction, two (or more) pusher members are simultaneously displaced from the second transverse position to the guide means in order thus to sort out one and the same product, or move it from the supporting surface in the transverse direction, using the at least two pusher members. As a result thereof, the orientation of the product during sorting can remain the same as the initial orientation of the product when it rested on the supporting surface. When using a single combination of guide means and associated switch device to laterally move a product off the supporting surface using two or more pusher members, which two or more pusher members are then thus displaced using the same switch device and guide means, the orientation of the product does change, which is referred to as non-parallel sorting.

The device may comprise a control module which is configured to be able to switch the presorting switch member between the passive and active presorting position, and is furthermore configured to be able to switch the switch member between the passive and active position, and which may furthermore be connected to the determining device and drive device, in order to thus operate said presorting switch member and switch member in dependence on said determination by the determining device, in combination with, for example, information about the conveying speed in conveying direction, at the correct point in time using the control module in order to change the position thereof.

In order to determine the carriers forming the part of the supporting surface on which a product rests, the determining device may be configured to detect the presence of a product in an optical way, such as via a video camera, in order thus to determine the carriers which are relevant for that product.

In a preferred embodiment, if, in use, the presorting switch member for a downstream pusher member of two directly succeeding pusher members is in the active presorting position, the presorting switch device is configured to be in the passive presorting position for the upstream pusher member of the two pusher members. Moving or keeping a pusher member associated with a carrier to or in the first transverse position in this way, after a pusher member of a downstream carrier adjacent thereto has been moved to the second position or kept in that position, creates more space between successive pusher members at the second transverse position, the effects of which have already been indicated above. In this case, it is possible for a length of the contact surface to be larger, in the conveying direction, also in case of parallel sorting, in which two switch devices have to be provided in succession at a relatively short distance, such as twice the pitch between successive carriers. As a result of this greater length, the displacement of a pusher member to the guide means from the second transverse position may take place more gradually, which reduces the forces acting on the pusher member and on the switch member. Consequently, the transversely directed forces and thus also the transverse acceleration on a product which is at the second transverse position and is to be moved in a transverse direction of the carrier using the pusher member are lower. Selectively presorting pusher members in this way is furthermore favourable as this makes it possible for a length of each of the pusher members to be relatively small, in a conveying direction, as a result of which, for example, small products and/or products which are located on the supporting surface at a limited intermediate distance can be moved off the supporting surface efficiently using presorted pusher members.

Preferably, the switch device and the presorting switch device are configured to displace a pusher member on account of contact between a contact surface of the switch member and the guide member of the pusher member.

The successive carriers are provided at a mutual pitch. A length of the contact surface of the switch member, viewed in the conveying direction, is preferably greater than the pitch. As a result thereof, moving the pusher member from the second transverse position to the guide means can be performed in a highly gradual manner, which reduces forces on the pusher member and on the switch member.

In a preferred embodiment, the device comprises a number of said switch devices, in each case on an upstream end of associated guide means, which are provided at a mutual distance in the conveying direction of at least twice the pitch. An effect thereof is that parallel sorting is effectively possible.

The guide member of each pusher member preferably has a guide wheel which is rotatable about a rotation axis which extends at right angles to the supporting surface, and a guide pin with a central axis which coincides with the rotation axis.

The switch device is preferably configured in such a way that, in use, in the active position of the switch member, the guide wheel of the guide member comes into contact with the contact surface.

In a preferred embodiment, the switch device has a longitudinal guide for guiding the guide member of a pusher member which is in the second transverse position in the conveying direction towards the switch member, which longitudinal guide is provided in such a way with respect to the switch member and in which the switch device is configured in such a way that, in use, the guide wheel of the guide member comes into contact with the contact surface in the active position of the switch member. As a result thereof, a guide member can be guided to the switch member efficiently and in a manner which is not susceptible to failure. Since the length of the contact surface may according to the invention be long, it is possible, in a constructionally relatively simple way, to allow the switch member to cooperate with the guide wheel in the active position and, in the passive position, to allow the guide wheel to pass the switch member in the second transverse position. Alternatively, it is in theory conceivable, within the framework of the invention, for the switch device to be configured in such a way that the guide pin comes into contact with the contact surface of the switch member.

The presorting switch device preferably has a presorting longitudinal guide for guiding the guide member of a pusher member in the conveying direction towards the presorting switch member. This presorting longitudinal guide may be provided in such a way with respect to the presorting switch member, and in which the switch device may be configured in such a way that, when displacing a pusher member, the guide pin of the guide member comes into contact with the presorting contact surface of the presorting switch member. As a result thereof, a guide member can be guided to the presorting switch member efficiently and in manner which is not susceptible to failure. Alternatively, it is in theory conceivable, within the framework of the invention, for the presorting switch device to be configured in such a way that the guide wheel comes into contact with the contact surface of the presorting switch member.

In a preferred embodiment, the stationary guiding member comprises an elongate guide profile, which may be, for example, a rail.

The guide means preferably comprise a stationary longitudinal guiding member which is connected to the frame and runs parallel to the conveying direction and extends downstream from the presorting switch device, at least up to the switch device and, if several switch devices are present, along all switch devices, for, in use, during transportation of the carriers in the conveying direction, guiding the guide member of a pusher member in the second transverse position. As a result thereof, the pusher members can efficiently be kept at the second transverse position or the pusher members can at least be prevented from moving back in the direction of the first transverse position.

It is favourable if the switch member comprises two successive switch elements, each of which define a successive part of the contact surface, with which two switch elements the guide member is successively in contact, in use, at least in the active position, in which the switch device also comprises a moving member for moving each of the two switch elements between a passive and an active position, in which, in the passive position, the guide member is outside the reach of the switch element and in which, in the active position of the switch member, at least one of the two switch elements is in the active position. As a result thereof, the movement between the active and passive position which each switch element has to complete can be smaller, which lowers the demands, for example with regards to the power and/or speed, of the moving member.

The moving member is preferably configured so as to be able to move the two switch elements independently from each other between the active and passive position. As a result thereof, the position of the upstream switch element of the two switch elements may for example in each case be changed sooner than the downstream switch element by means of the moving member which is actuated by the control module. That is to say that when a guide wheel of a pusher member is still in contact with the downstream switch element, which is in the active position, the upstream switch element can already be moved to the passive position, which may be the case if the guide wheel following said guide wheel has to stay in the second transverse position and has to pass along the switch device, because this has to be moved, for example at the location of a switch device provided further downstream, to the guide means associated with this further switch device in order there, that is to say at a discharge location which is present there, to laterally move a product off the supporting surface.

In a preferred embodiment, each of the two switch elements is configured as a pivot arm, or a flipper, and is pivotable between the active and passive position about a vertical pivot axis, in which the moving member is configured for rotatably driving the switch elements about the respective pivot axis. In this way, the switch elements can be moved between the passive and active position in a simple manner. In addition, moments of torque due to contact with the pusher member resulting from the use of the at least two switch elements are relatively low.

The respective pivot axes are preferably provided at mutually remote ends of the flippers and in which, in the active position, the free ends of the flippers adjoin each other in such a way that the contact surface extends continuously along the flippers.

Preferably, the drive device comprises an endless drivable flexible conveyor member, such as a chain, in which the successive carriers are coupled to the conveyor member.

The present invention also relates to a method, according to claim 18, for sorting of products using an above-described device according to the invention, comprising:

a) using a supply device to supply a stream of products to be sorted on the supporting surface of the device, b) conveying the carriers in the conveying direction and according to an endless conveying path using the drive device of the device, which carriers thus carry the products to be sorted, c) for the purpose of laterally moving a product located on the supporting surface from the stream of products at a discharge location off the supporting surface to a discharge device, c1) using the presorting switch device, in the active presorting position of the presorting switch member, to cause a pusher member with which the product, that is to say the product situated next thereto, is to be laterally moved off the supporting surface to remain in or move to the second transverse position, c2) using the switch device provided downstream of the presorting switch device, in the active position of the switch member thereof, on account of contact between a contact surface of the switch member and the guide member of the pusher member, which is in the second transverse position, to move the pusher member in the length direction of the associated carrier, in such a way that the guide member is subsequently guided by the guiding member in order thus to move the pusher member in the length direction of the associated carrier in order to thus laterally move the product off the supporting surface, and d) discharging the product using the discharge device associated with that discharge location.

Pusher members which do not have to be used to laterally move a product off the supporting surface are kept in or moved to the first transverse position by means of the presorting switch device in the passive presorting position of the presorting switch member.

The control module of the device according to the invention is preferably configured to, in use, perform the abovementioned steps according to the method according to the invention, in particular steps b and c.

Preferably, the method, for the purpose of step c1, comprises:
  determining carriers which form the section of the supporting surface on which a product rests using a determining device,
  for the purpose of at least one pusher member of the pusher members associated with the determined carriers, allowing the presorting switch member of the presorting switch device to be in the active presorting position, and
  for the purpose of the pusher member which is situated directly upstream of the most upstream pusher member allowing the presorting switch member to be in the passive presorting position. As a result thereof, that directly upstream pusher member can subsequently pass in the first transverse position along the switch device, outside the reach thereof.

For the purpose of step c1, it is furthermore favourable, if the presorting switch member is in the active presorting position for the benefit of a downstream pusher member of two directly succeeding pusher members, for the presorting switch member to be in the passive presorting position for the benefit of the upstream pusher member of those two pusher members.

In an embodiment, according to the method, the stream of products is supplied on the supporting surface of the device in such a way that a side of the products which is located on the side of the pusher members is in such a transverse position that pusher members which are in the second transverse position only just touch the products or do not quite touch them.

Furthermore, the invention relates to a system, according to claim 17, for sorting products preferably according to the method according to the invention, comprising an abovedescribed device according to the present invention.

Advantages of the method and the system according to the invention are analogous to the abovementioned advantages of the device according to the invention. Preferred embodiments of the device according to the invention, as described above, can analogously be used with the method and the system according to the invention.

BRIEF DESCRIPTION OF THE DRAWINGS

The present invention will be explained below by means of the description of a preferred embodiment of a device according to the present invention referring to the following diagrammatic figures, in which.

DETAILED DESCRIPTION

Figure 1:
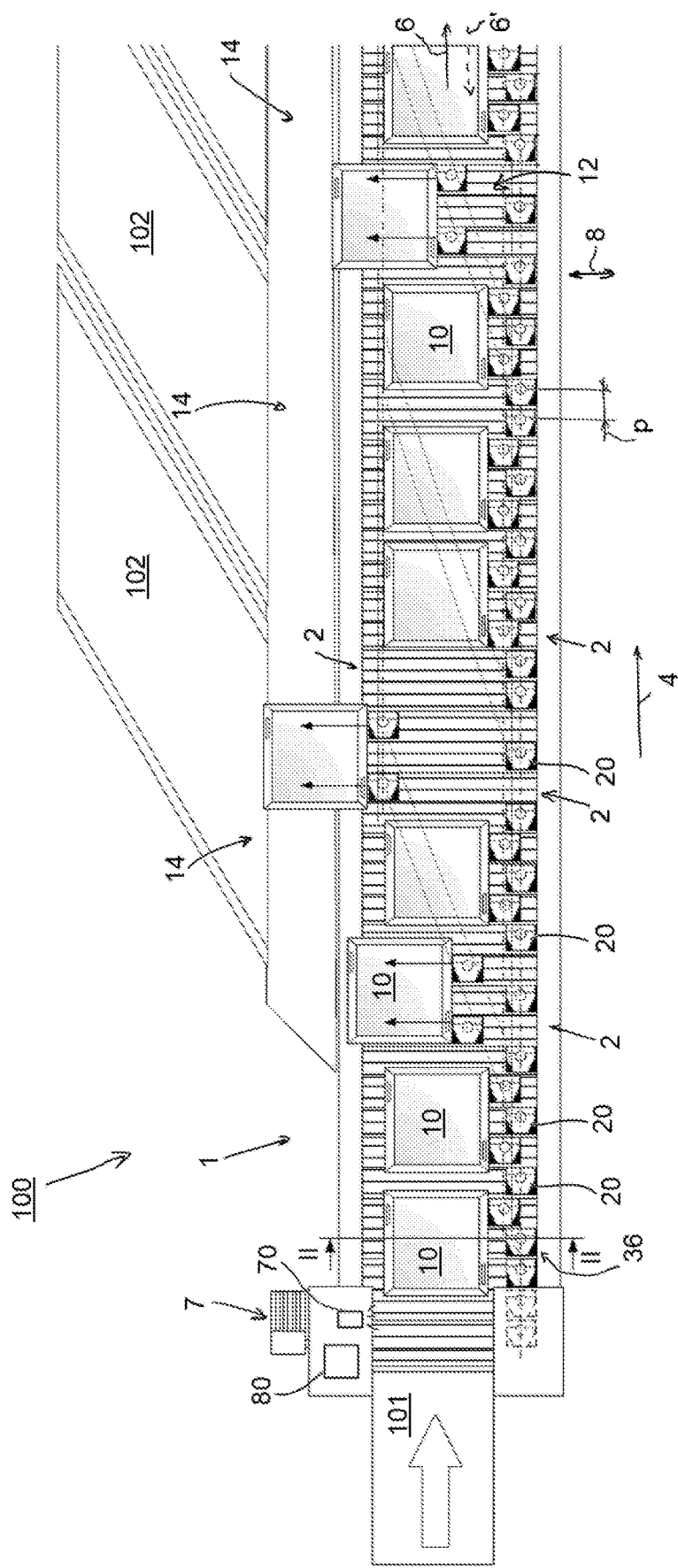
FIG. 1 shows a top view of a part of a system comprising a device according to the present invention.

FIG. 1 shows a sorting device 1 as preferred illustrative embodiment of a device according to the present invention. The device 1 has successive elongate carriers 2 (only some of the carriers shown in FIG. 1 are provided with a reference numeral) which are conveyed along an endless conveying path 6 in a conveying direction 4 when the device 1 is in use. The carriers 2 extend with their length direction at right angles to the conveying direction 6, i.e. in a transverse direction 8. The carriers 2 form a supporting surface 12 for products 10, at least on the top side (as will be explained below) of the device.

The device 1 forms part of a system 100 for sorting products 10. The system 100 furthermore has a supply device 101 for supplying a stream of products 10 to be sorted to the supporting surface 12 of the device 1, and a number of discharge devices 102 which adjoin the device 1 at the location of respective discharge locations 14. Using the device 1, products 10, for example parcels to be sent, can be sorted per order or shipping destination, for which purpose each of the discharge devices may be associated with the order or the shipping destination. The supply device 101 may comprise a conveyor. Alternatively, the supply device may be, for example, a supply station, at the location of which products are manually placed on the device 1. The discharge device 102 may comprise a chute or, for example, a conveyor, on which products land when these are moved off the supporting surface 12, as will be described below in detail.

Figure 2:
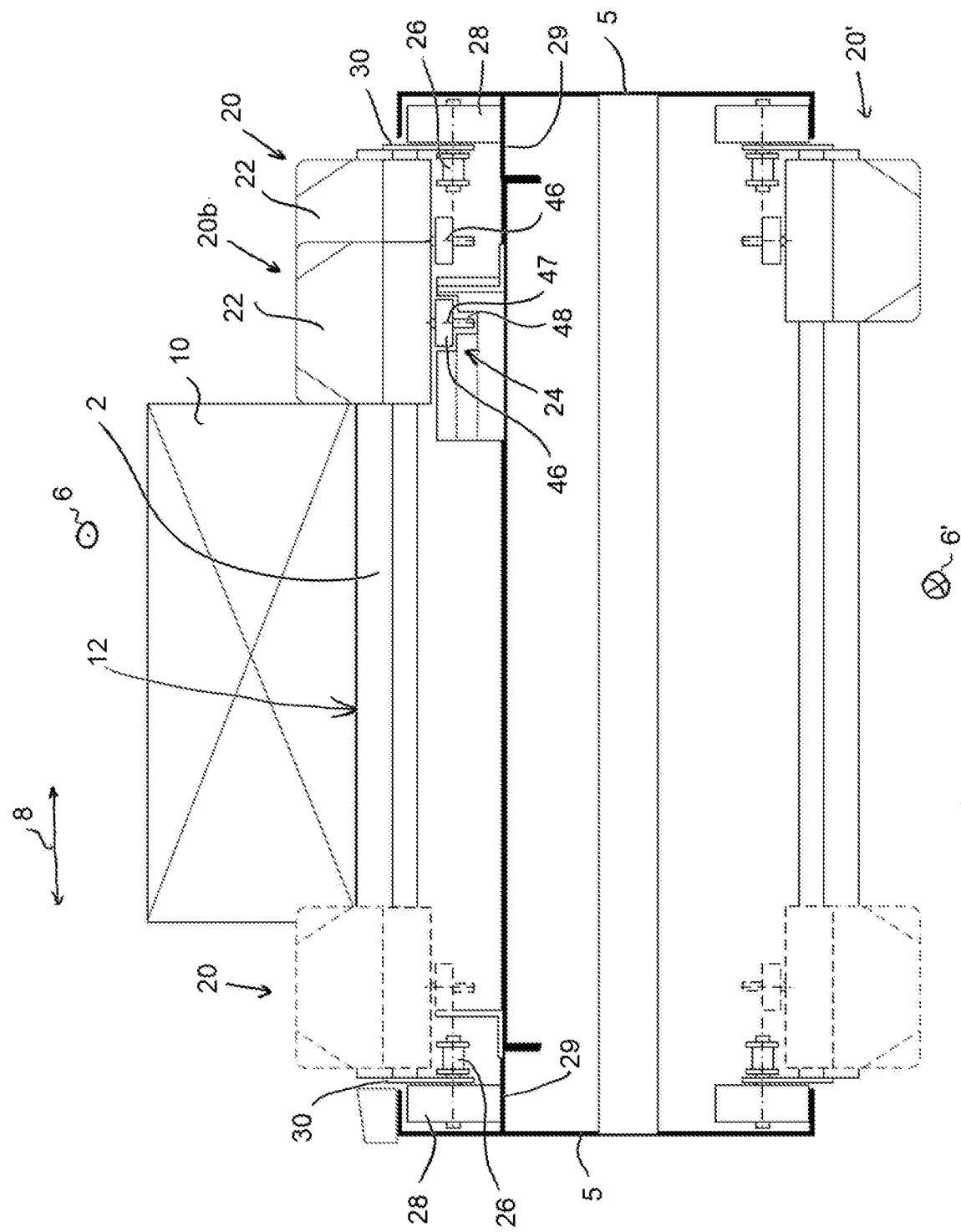
FIG. 2 shows a section II-II according to FIG. 1, FIG. 3 diagrammatically shows a top view of some components of and transverse positions in the device according to FIG. 1.

The carriers 2 are mutually connected by a conveyor chain 26 via coupling plates 30 (see FIG. 2). The carriers 2 are provided at a pitch p with respect to each other. The carriers 2 may move, or be conveyed, in an endless path. At a top side, or at least a relatively high side, of the device 1, where the carriers form the supporting surface, the carriers 2 move in the conveying direction 4, after which these, at a downstream end of the device 1, where a chain wheel is provided for the conveyor chain (not shown in the figures), move downwards around the chain wheel and subsequently move counter to the conveying direction at a lower side of the device 1 (pusher member 20' in FIG. 2). This return part of the conveying path is indicated by the dashed arrow 6' in FIG. 1. At the location of an upstream end of the device 1, where the supply device 101 adjoins the device 1, the carriers move upwards around a chain wheel (not shown in the figures) which is provided there, after which the carriers again move in the conveying direction to convey products, on the supporting surface 12, from the upstream end in the direction of the downstream end. The device 1 has a drive device 7 (only shown highly diagrammatically in FIG. 1) for driving the carriers 2 in such a way that these, at least on the top side of the device, where the carriers 2 form the supporting surface 12, move in the conveying direction 4. The drive device 7 may comprise a drive motor for driving, for example, one or both said chain wheels and/or additional chain wheels in a rotating manner. The device has a frame 5 with a running surface 29 over which running wheels 28 roll which are connected to the carriers 2, more specifically to the coupling brackets 30.

Figure 4:
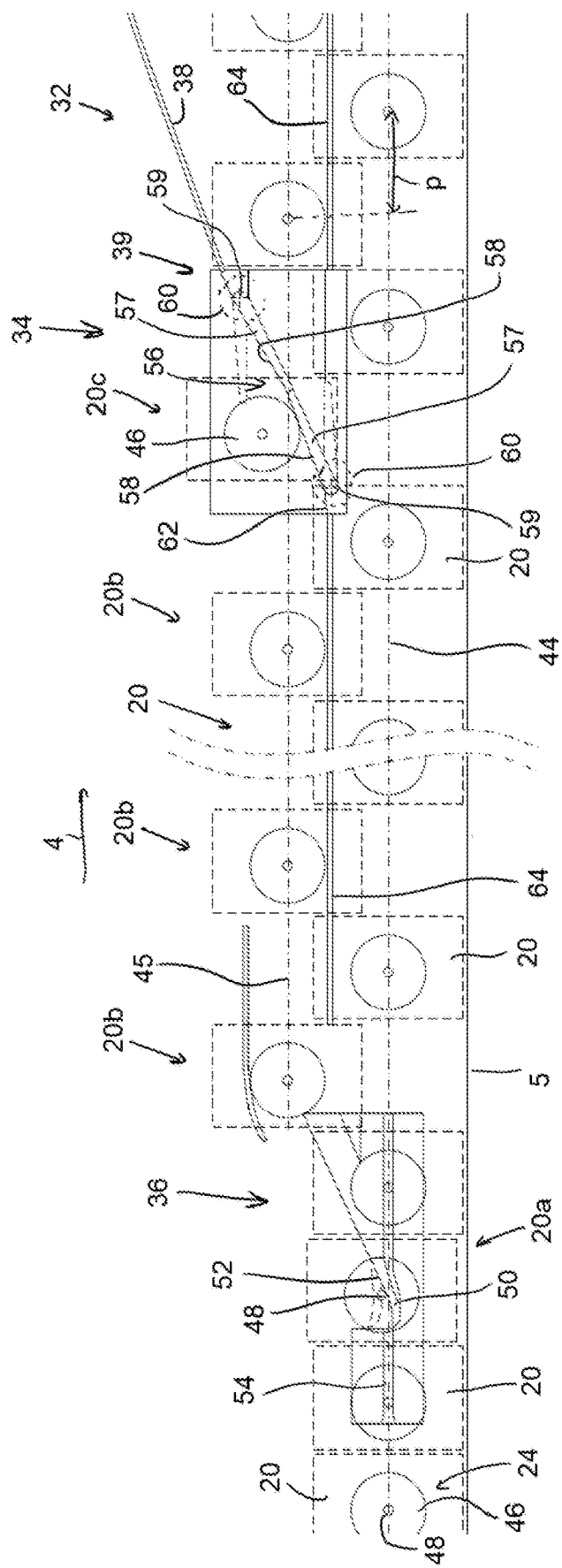
FIG. 4 shows some components of the device according to FIG. 1 in more detail.

The device 1 has pusher members 20, each of which is movable along a carrier 2. In FIGS. 1 and 4, some of the illustrated pusher members are provided with a reference numeral. On a first, top side of the carrier 2, which is situated on the supporting surface 12, each of the pusher members 20 comprises a pusher shoe 22 and, on an opposite second, bottom side of the carrier 2, a guide member 24, which is connected to the pusher shoe. As FIG. 2 shows, the pusher shoes 22 protrude above the supporting surface 12 and can thus be used to move a product 10 in a transverse direction of the supporting surface 12, that is to say to push it aside.

In the view from FIG. 2, a product can be moved to the left over the supporting surface 12 using the illustrated pusher shoes 22.

For each discharge location 14, the device 1 has guide means 32 with an associated switch device 34, and furthermore a presorting switch device 36, in which, in use, products 10 which are supplied via the supply device 101 on the supporting surface 12 can each be moved off the supporting surface at the location of a discharge location 14 using the presorting switch device 36 and the switch device 34 associated with this discharge location. In the illustrated figures, three successive discharge locations 14 are shown. For the purpose of each one of these, a pair of guide means 32 is provided with an associated switch device 34 each. As a result thereof, products 10 can be parallel sorted to a discharge device 102. That is to say that the orientation of the product can stay the same as the orientation in which the product lies on the supporting surface 12, as FIG. 1 shows. The reason for this is that a product, at least in the illustrated example, is moved in the transverse direction using two pusher members 20 simultaneously. Within the context of the invention, it is also possible to provide a single, or more than two, guide means and associated switch device(s) per discharge location. When using a single combination of guide means and associated switch device sorting takes place in a non-parallel manner and the orientation of the product does change during sorting and in such a way that a side of the product becomes substantially parallel to the extending direction of the guide means.

Figure 3:
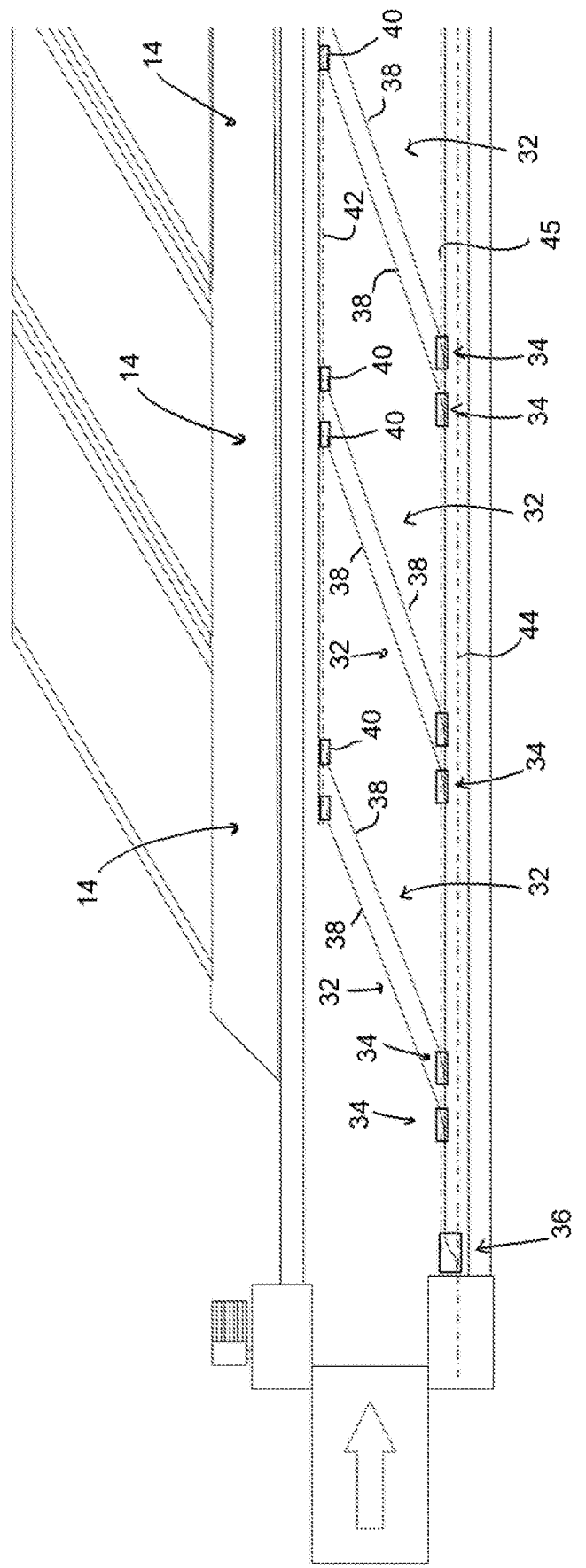

The guide means 32 which are provided on the frame comprise a stationary guiding member which is connected to the frame 5 and is formed by an elongate guide profile 38 which runs substantially at an angle with respect to the conveying direction 4, for guiding, in use, during transport of the carriers 2 in the conveying direction 4, the guide member 24 of a pusher member 20 in order to thus move the pusher member 20 in the length direction of the associated carrier 2, i.e. in transverse direction 8, for the purpose of laterally moving a product 10 situated on the supporting surface off the supporting surface 12 at a discharge location 14. The guide means 32 furthermore have a bend piece 40 at the downstream end of the guide profile 38. As a result thereof, the pusher member 20 is gradually guided to an end position in the transverse direction at the end of the transverse movement of the pusher member 20, which end position is denoted in FIG. 3 by the line with reference numeral 42 and which is situated on a longitudinal side of the device, as FIG. 3 shows. In FIG. 2, the pusher member 20 which is situated furthest to the left at the top and is drawn with a dashed line is in said end position 42. When moving the carriers 2 back at the bottom side of the device, the pusher members 20 are, if necessary, moved back to a first transverse position (pusher member 20' at the bottom right in FIG. 2) by means of an abovementioned resetting guiding member, if necessary from this end position 42 (the pusher member shown in dashed lines at the bottom left in FIG. 2 is in this end position 42). The first transverse position is indicated by the line with reference numeral 44 in FIG. 3 and situated, as is illustrated, at an opposite longitudinal side of the device, i.e. of the supporting surface. The guide member 24 of each pusher member 20 has a guide wheel 46 which is rotatable about a rotation axis 47 which extends at right angles to the supporting surface 12, and a guide pin 48 with a central axis which coincides with the rotation axis 47. The guide profile 38 is provided on the frame 5 in such a way that the guide wheel 46 is in contact with the guide profile 38. As FIGS. 1 and 3 show, the guide profiles 38 of the guide means provided for the purpose of a discharge location 14 extend mutually parallel, at an angle of approximately 25 degrees with respect to the conveying direction 4, and in a conveying direction at a mutual distance of twice the pitch between successive carriers 2, for the purpose of parallel sorting, as described above.

In addition, the device 1 has a presorting switch device 36 comprising a presorting switch member 50 which can be switched between a passive and an active presorting position thereof and is configured for, in the passive presorting position, allowing a pusher member 20 which is in the first transition position 44 to pass along the presorting switch member 50, or to keep the pusher member in the first transverse position 44, and for, in the active presorting position, on account of contact between a presorting contact surface 52 of the presorting switch member 50 and the guide member 24, more specifically the guide pin 48, of a pusher member 20, moving the pusher member 20 from the first transverse position 44 to a second transverse position 45 in the length direction of the associated carrier 2. Just like the first transverse position 44, the second transverse position 45 is situated on the longitudinal side of the device opposite the above-described end position 42, but between the first position and the end position 42, or between the first position 44 and the guide means 32 or at least the guiding member 38 of the guide means. FIG. 4 shows a number of pusher members 20 in mutually different transverse positions. The pusher members denoted by reference numeral 20 are in the first transverse position 44. A pusher member 20 provided with an additional a behind the reference numeral only just touches the contact surface 52 of the presorting switch member 50 to be moved from the first transverse position 44 to the second transverse position 45. Pusher members 20 denoted by the additional b behind the reference numeral have been moved from the first transverse position 44 to the second transverse position 45 using the presorting switch member 50. See also FIG. 2.

The presorting switch device 36 furthermore has a presorting longitudinal guide 54 for guiding the guide pin 48 of a pusher member 20 which is in the first transverse position in a conveying direction 4 towards the presorting switch member 50. The presorting longitudinal guide 54 is provided in such a way with respect to the presorting switch member 50 that, in use, in the active presorting position of the presorting switch member 50, the guide pin 48 of the guide member 24 comes into contact with the presorting contact surface 52. At its upstream end, the presorting longitudinal guide 54 is widened to a certain degree, in such a way that it has a funnel-shaped construction. As a result thereof, pusher members 20 which are, for whatever reason, slightly next to the first transverse position 44, are also effectively guided towards the presorting switch member 52 in the first transverse position 44.

The device furthermore comprises a determining device 70 configured for determining the carrier(s) 2 which define the section of the supporting surface 12 on which a product 10 rests. The device 1 furthermore comprises a control module 80 which is configured to be able to switch the presorting switch member 36 between its passive and active presorting position, and is furthermore configured to be able to switch each of the switch members 34 independently between its passive and active position, and which is furthermore connected to the determining device 70 and drive device 7 in order thus to operate said presorting switch member and switch member at the correct point in time, based on said determination by the determining device 70 in combination with information about the conveying speed in a conveying direction 4, by means of the control module 80 in order to change the position thereof.

Each of the switchable switch devices 34 provided downstream of the presorting switch device 36 is provided at the location of an upstream end 39 of a guiding member 32 associated with this switch device. Each of these switch devices 34 comprises a switch member 56 which can be switched between a passive and an active position thereof. It is configured for, in the passive position, allowing a pusher member which is in the second transverse position 45 to pass along the upstream end 39 of the guiding member. In other words, that pusher member remains in the second transverse position 45 and can be moved by a downstream switch device to guide means associated with that switch device in order thus to move a product off the supporting surface there. In FIG. 4, the reference numeral of such pusher members 20 which are in the second transverse position has had the letter b added to it. The switch member 56 is furthermore suitable for, in the active position, on account of contact between a contact surface 58 of the switch member 56 and the guide member 24, more specifically the guide wheel 46 thereof, moving a pusher member 20 which is in the second transverse position 45 in the length direction of the associated carrier 2, in such a way that the guide wheel 46 is subsequently guided by the guiding member 32. FIG. 4 shows a pusher member 20 (the pusher member 20 with the addition c behind the reference numeral), the guiding wheel 46 of which is in contact with the contact surface 58, that is to say rolls over it, in order subsequently to be guided by the guide profile 38. FIG. 4 shows the switch member 56 in the active position thereof.

The switch member 56 has two successive switch elements which are configured as flippers 57, each of which defines a successive part of the contact surface 58. In the active position, the guide wheel 46 is successively in contact with the two flippers 57. The flippers 57 are pivotable about a vertical pivot axis 59 between an active and passive position thereof. The switch device 34 furthermore has a moving member in the form of a servomotor 60 for each flipper 57, which servormotor 60 is operatively connected to the control module 80 and actuated thereby, for driving the flipper in a rotating manner in order thus to move each of the two flippers 57 between the passive and the active position thereof by means of a pivoting movement. In the passive position, the switch elements 57 are outside the reach of the guide wheel 46. This passive position of the switch elements 57 is indicated in FIG. 4 by the dotted line. The respective pivot axles of the flippers are provided on ends of the flippers 57 which are remote from each other. In the active position, the free ends of the flippers 57 adjoin each other in such a manner that the contact surface 58 extends continuously along the flippers. This active position is shown in FIG. 4 (by solid lines). In the active position of the switch member 56, at least one of the flippers is in the active position thereof. In use, the upstream one of the two flippers 57, i.e. in the view from FIG. 4 the left-hand flipper, may already be in the active position for guiding the guide wheel 46 along it, while the downstream flipper is still in the passive position. Analogously, it is possible to already pivot this flipper back to its passive position after the guide wheel 46 has passed the part of the contact surface 58 formed by the upstream flipper, while the downstream flipper is still kept in the active position for the purpose of guiding the guide wheel along the latter towards the guide profile. Preferably, however, the moving member is configured for simultaneously moving the two flippers 57 between the active and passive position.

In addition, the switch device has a longitudinal guide 62 for, in the second transverse position 45, guiding the guide wheel 46 to the switch member 56 in conveying direction 4.

The guide means 32 furthermore have a stationary longitudinal guiding member which is connected to the frame 5 and is in the form of a longitudinal guide profile 64 which extends parallel to the conveying direction 4 at the second transverse position 45, that is to say, which is positioned for guiding guide wheels 46 of pusher members 20 in the second transverse position 45. The longitudinal guide profile 64 extends downstream from the presorting switch device 36, at least up to the switch device 34. In the example illustrated in the figures, the longitudinal guide profile 64 extends downstream from the presorting switch device 36 along the entire (remaining) length of the device 1. The longitudinal guide profile 64 is in each case interrupted at the location of a switch device 34 to make room for the upstream flipper 57 and longitudinal guide 62 of that switch device 34.

As can be seen in particular in FIG. 4, guide members 24 of pusher members 20 which are in the first transverse position 44 are outside the reach of the switch device 34 and, in use, pass along it, irrespective of the position of the switch member 56.

In use, the presorting switch device 36 is configured to move in each case only one downstream pusher member 20 of two directly succeeding pusher members 20 from the first transverse position 44 to the second transverse position 45 along the carrier 2, in the active presorting position of the presorting switch member 50, and obviously if the respective downstream pusher member 20 has to be used to move a product 10 off the supporting surface. See also FIG. 4 in this respect. Thus, a pusher member 20 is only moved to the second transverse position 45 if the pusher member 20 is required to sort out a product, or, to move the latter off the supporting surface 12 in transverse direction by means of the pusher member 20. As a result of this selective presorting of pusher members, there is more space and time for providing the switch device 34 or for switching using the switch device, or, for moving the switch member 56 between the active and passive position. As a result thereof, the length of the contact surface 58 of the switch member 56, viewed in conveying direction 4, is longer than the pitch between two successive carriers 2, as FIG. 4 shows. As a result thereof, deflecting the guiding wheel 46 from the second transverse position 45 to the guide profile 38 can take place more gradually, which reduces the forces acting on the guiding wheel 46 and on the switch member 56. In the example according to the figures, the length of the contact surface 58 of the switch elements 57 is between one and a half and two times the pitch.

Due to pusher members being selectively moved to the second transverse position as described above, a second combination of a switch device 34 and guide means 32 is provided at a mutual distance of two times the pitch in a conveying direction 4 for the purpose of parallel sorting. See FIG. 3.

In use, products 10 are placed on the supporting surface 12 of the device 1 in such a way that a side of the products 10 which is situated on the side of the pusher members, which are situated at the upstream end of the device and thus in the first transverse position, is situated in such a transverse position that pusher members 20 which are in the second transverse position 45 downstream of the presorting switch device only just, or not quite, come into contact with the product 10, and are thus still free from the product in the first position 44. As a result thereof, the respective pusher members 20 can easily and quickly be moved by the presorting switch device 36, and thus over a short required distance in a conveying direction 4, since no forces are (yet) exerted on the pusher shoes 22 of the pusher members. As a result thereof, guiding pusher members 20 from the second transverse position 45 in a transverse direction to the guide profile 38 using the switch member 56 can be effected without, or at least with greatly reduced, impact of the pusher shoes 22 on the products to be moved, as the pusher shoes 22 are already at least virtually in contact with a product 10.

According to the invention, in the active presorting position of the presorting switch member 52, for the purpose of laterally moving a product 10 of the stream of products, which product is located on the supporting surface 12, off the supporting surface at a discharge location 14 and onto a discharge device 102 using the presorting switch device 36, a pusher member 20 with which that product later, at the location of the discharge location, has to be moved laterally off the supporting surface is moved to the second transverse position. Each time the presorting switch member is in the active presorting position for the purpose of a downstream pusher member of two directly succeeding pusher members, it is in the passive presorting position for the purpose of the upstream pusher member of these two pusher members, so that this last-mentioned pusher member remains in the first transverse position and can thus not be used to move a product off the supporting surface.

Subsequently, using one of the switch devices 34 which are provided downstream of the presorting switch device 36, in the active position of the switch member 56 of that switch device 34, said pusher member, with which a product which is to be laterally moved off the supporting surface at this respective switch device 34, is moved in the length direction of the associated carrier in such a way that the guide member of that pusher member 20 is subsequently guided by the guiding member in order thus to move the pusher member in the length direction of the associated carrier and consequently to laterally move the product off the supporting surface. Finally, the respective product is discharged further using the discharge device associated with that discharge location.

The invention claimed is:

1. A device (1) for sorting products, comprising:
a frame,
successive elongate carriers (2) which form a supporting surface (12) for products,
a drive device (7) for conveying the carriers in a conveying direction (4) and along an endless conveying path, in which a length direction of each of the carriers extends at a right angle relative to the conveying direction, in a transverse direction (8),
pusher members (20), each of which is displaceable along a carrier, each of the pusher members including a pusher shoe (22) on a first side of the carrier situated on the supporting surface, and, on an opposite second side of the carrier, a guide member (24) which is connected to the pusher shoe,
guide means (32) which are provided on the frame, including a stationary guiding member (38) which is connected to the frame and runs substantially at an angle with respect to the conveying direction for, in use, during transportation of the carriers in the conveying direction, guiding the guide member of a pusher member in order thus to displace the pusher member in the length direction of the associated carrier for laterally moving a product situated on the supporting surface at a discharge location (14) off the supporting surface,
a presorting switch device (36) which is provided on the frame and including a presorting switch member (50) which can be switched between a passive presorting position and an active presorting position and is configured such that, in the passive presorting position, the presorting switch device causes a pusher member to remain in a first transverse position (44) or to move towards the product in the length direction of the associated carrier to a second, other, transverse position (45), and, in the active presorting position, the presorting switch device causes a pusher member to remain in the second transverse position or to move towards the product in the length direction of the associated carrier, in which the guide means are situated on a side of the second transverse position and face away from the first transverse position,
a switchable switch device (34) provided downstream of the presorting switch device and is provided on the frame, at an upstream end (39) of the guiding member, and including a switch member (56) which is switchable between a passive position and an active position thereof and is configured to allow, in the passive position, a pusher member which is in the second transverse position to pass along the upstream end of the guiding member, and, in the active position, to move a pusher member which is in the second transverse position in the length direction of the associated carrier on account of contact between a contact surface of the switch member and the guide member of the pusher member, in such a way that the guide member is subsequently guided by the guiding member, in which guide members of pusher members which are in the first transverse position are outside a reach of the switch device and, in use, pass along the product irrespective of the position of the switch member.

2. The device according to claim 1, further comprising a determining device configured to determine the carriers which form at least a portion of the supporting surface on which a product rests, wherein the presorting switch device is configured:
to be in the active presorting position for at least one pusher member of the pusher members associated with the determined carriers, and
to be in the passive presorting position for the pusher member which is situated directly upstream of most upstream pusher member of the pusher members.

3. The device according to claim 1, wherein if, in use, the presorting switch member for a downstream pusher member of two consecutive pusher members is in the active presorting position, the presorting switch device is configured to be in the passive presorting position for an upstream pusher member of the two consecutive pusher members.

4. The device according to claim 1 wherein the presorting switch device and the presorting switch device are configured to displace a pusher member on account of contact between a contact surface of the presorting switch member and the guide member of the pusher member.

5. The device according to claim 4, wherein the successive carriers are provided at a mutual pitch, in which a length of the contact surface of the presorting switch member, viewed in the conveying direction, is greater than the pitch.

6. The device according to claim 1, wherein the successive carriers are provided at a mutual pitch, the device further comprising a number of said switch devices, in each case on an upstream end of associated guide means, which are provided at a mutual distance in the conveying direction of at least twice the pitch.

7. The device according to claim 1, wherein the guide member of each pusher member has a guide wheel which is rotatable about a rotation axis which extends at right angles to the supporting surface, and has a guide pin with a central axis which coincides with the rotation axis.

8. The device according to claim 7, wherein the switch device has a longitudinal guide for guiding the guide member of a pusher member which is in the second transverse position in the conveying direction towards the switch member, which longitudinal guide is provided in such a way with respect to the switch member that, in use, the guide wheel of the guide member comes into contact with the contact surface in the active position of the switch member.

9. The device according to claim 4, wherein the presorting switch device has a presorting longitudinal guide for guiding the guide member of a pusher member in the conveying direction towards the presorting switch member, which presorting longitudinal guide is provided in such a way with respect to the presorting switch member, and wherein the presorting switch member is configured in such a way that, when displacing a pusher member, the guide pin of the guide member comes into contact with a presorting contact surface of the presorting switch member.

10. The device according to claim 1, wherein the stationary guiding member comprises an elongate guide profile.

11. The device according to claim 1, wherein the guide means further includes a stationary longitudinal guiding member which is connected to the frame and runs parallel to the conveying direction and extends downstream from the presorting switch device, at least up to the switch device for, in use, during transportation of the carriers in the conveying direction, guiding the guide member of a pusher member in the second transverse position.

12. The device according to claim 1, in which the switch member comprises two successive switch elements, each of which define a successive part of the contact surface, with which two switch elements the guide member is successively in contact, in use, at least in the active position, in which the switch device also comprises a moving member for moving each of the two switch elements between a passive and an active position, in which, in the passive position, the switch element is outside a reach of the guide member and in which, in the active position of the switch member, at least one of the two switch elements is in the active position.

13. The device according to claim 12, in which each of the two switch elements is configured as a flipper and is pivotable between the active and passive position about a vertical pivot axis, in which the moving member is configured for rotatably driving the switch elements about the respective pivot axis.

14. The device according to claim 13, in which the respective pivot axes are provided at mutually remote ends of the flippers and in which, in the active position, free ends of the flippers adjoin each other in such a way that the contact surface extends continuously along the flippers.

15. The device according to claim 1, further comprising a control module which is configured to switch the presorting switch member between the passive and active presorting positions, and is configured to switch the switch member between the passive and active position.

16. The device according to claim 1, wherein the drive device further includes an endless drivable flexible conveyor member and the successive carriers are coupled to the conveyor member.

17. A system for sorting products, comprising
the device according to claim 1,
a supply device for supplying a stream of products to be sorted on the supporting surface of the device,
a number of discharge devices which adjoin the device at respective discharge locations, the device including guide means with an associated switch device for each discharge location, and including at least one presorting switch device, wherein in use, products which are supplied via the supply device on the supporting surface can each be moved off the supporting surface at the discharge location using one of the at least one presorting switch device and the switch device associated with this discharge location.

18. A method for sorting products, using the device according to claim 1, the method comprising:
a) using a supply device to supply a stream of products to be sorted on the supporting surface of the device,
b) conveying the carriers in the conveying direction and according to an endless conveying path using the drive device of the device,
c) laterally moving a product located on the supporting surface from the stream of products at a discharge location off the supporting surface to a discharge device,
c1) using the presorting switch device, in the active presorting position of the presorting switch member, to cause a pusher member with which the product is to be laterally moved off the supporting surface to remain in or move to the second transverse position,
c2) using a switchable switch device provided downstream of the presorting switch device, in the active position of the switch member thereof, on account of contact between a contact surface of the switch member and the guide member of the pusher member, which is in the second transverse position, to move the pusher member in the length direction of the associated carrier, in such a way that the guide member is subsequently guided by the guiding member in order thus to move the pusher member in the length direction of the associated carrier in order to thus laterally move the product off the supporting surface, and
d) discharging the product using the discharge device associated with that discharge location.

19. The method according to claim 18, wherein using the presorting switch device further includes:
determining carriers which form at least a portion of the supporting surface on which a product rests using a determining device,
allowing the presorting switch member of the presorting switch device to be in the active presorting position for the at least one pusher member of the pusher members associated with the determined carriers, and
allowing the presorting switch member to be in the passive presorting position for the pusher member that is situated directly upstream of most upstream pusher member of the pusher members.

20. The method according to claim 18, wherein while using the presorting switch device, if the presorting switch member is in the active presorting position for a downstream pusher member of two consecutive pusher members, allowing the presorting switch member to be in the passive presorting position for an upstream pusher member of the two consecutive pusher members.

21. The method according to claim 18, wherein the stream of products is supplied on the supporting surface of the device in such a way that a side of the products which is located on the side of the pusher members is in such a transverse position that pusher members which are in the second transverse position only just touch the products or do not quite touch them.

* * * * *